United States Patent Office 3,082,821
Patented Mar. 26, 1963

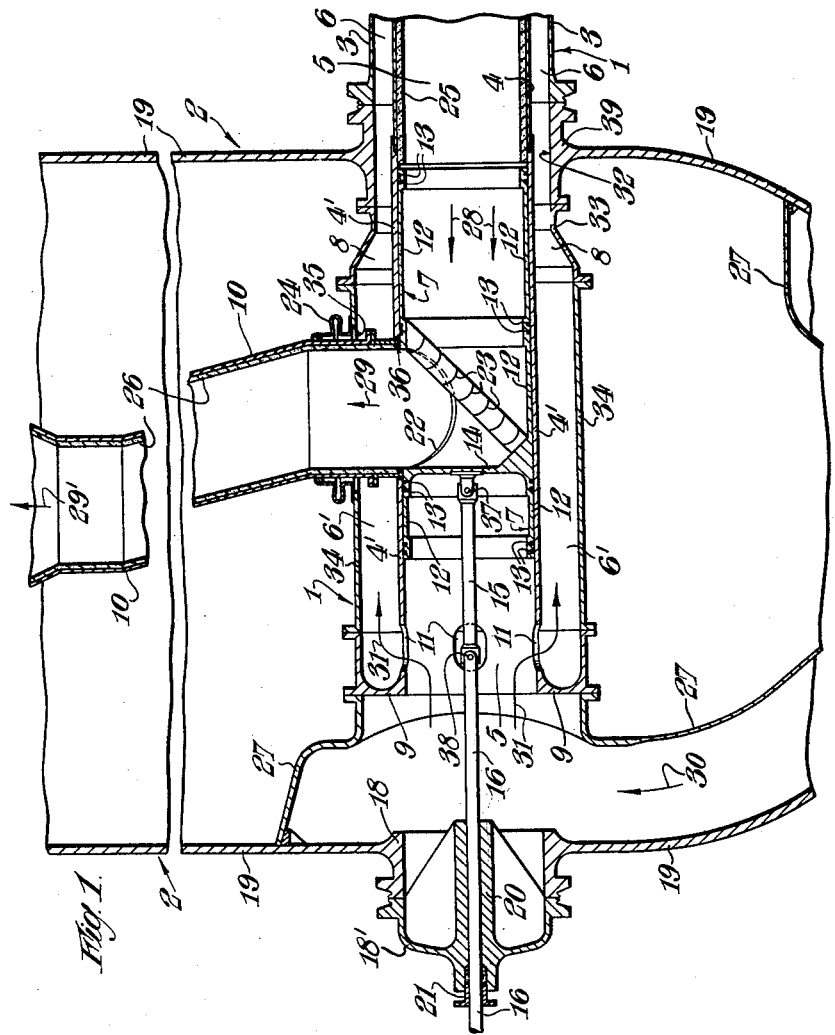

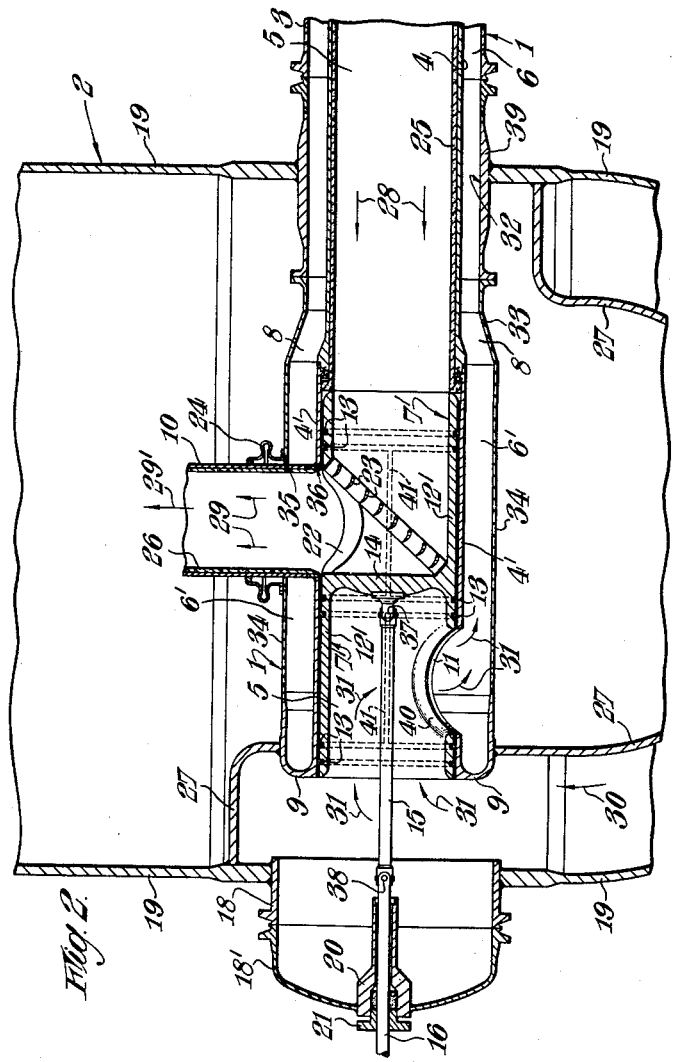

3,082,821
VALVED DUCTING
Gordon Brown, Wigan, England, assignor to The United
Kingdom Atomic Energy Authority, London, England
Filed Aug. 24, 1959, Ser. No. 835,670
Claims priority, application Great Britain Sept. 10, 1958
4 Claims. (Cl. 165—66)

This invention relates to valved ducting suitable for fluid flow to and from a heat exchanger.

The flow of fluid under pressure between a heat source (such as a nuclear reactor) and a heat exchanger normally required inflow and outflow ducts extending therebetween. With both the heat source and the heat exchanger firmly secured to the ground, thermal expansions and contractions can be accommodated only by providing some form of compensating device, for example bellows, in the ducts. By making the inflow and outflow ducts coaxial, expansion and contraction problems can be materially lessened, especially where the heat exchanger can be supported so as to be capable of movement relative to the heat source. However the use of coaxial ducts introduces consequent difficulties e.g. in the provision of valving for the ducts to enable the heat exchanger to be isolated from the heat source.

According to the invention coaxial valved ducting suitable for fluid flow to and from a heat exchanger has an outer pipe, an inner pipe providing a duct for the flow of hot fluid, the annulus between the pipes providing a duct for countercurrent flow of cool fluid, and a single flow control valve adapted simultaneously to control fluid flow in both said ducts.

The flow control valve is preferably of the sleeve type.

The pipes at one end of the ducting are preferably sealed together in such a manner as to leave open the end of the inner pipe, the inner pipe having a hot fluid outlet spaced from said end of the ducting and a port adjacent to said end of the ducting, which port communicates with the said annulus and provides an inlet thereto for cool fluid entering the open end of the inner pipe, the sleeve type valve being positioned in the inner pipe and movable simultaneously to open or close the cool fluid inlet and hot fluid outlet, and furthermore having an internal partition to prevent the passage of cool fluid otherwise than through the said port.

The coaxial valved ducting when applied to a heat exchanger preferably extends into the heat exchanger and the sleeve type valve is disposed within the heat exchanger and has an operating rod extending across the heat exchanger and projecting outwardly through the wall thereof at a position which is opposed to the entry position of the ducting and which is in the heat exchanger flow path of the cool fluid.

In one embodiment, the sleeve type valve has a piston movable axially to operate the valve, the operating rod being connected to the piston and being movable longitudinally to operate the valve.

In another embodiment, the sleeve type valve has a sleeve rotatable to operate the valve, the operating rod being connected to the sleeve and being rotatable to operate the valve.

Spaced longitudinal ribs are preferably provided between the pipes in the region of the sleeve type valve.

By way of example, the invention will now be described with reference to the accompanying drawings wherein FIGS. 1 and 2 are fragmentary side views in medial section of coaxial valved ducting according to the invention and applied to a heat exchanger.

Referring to FIG. 1, as applied by way of example to coaxial valved ducting 1 for gaseous coolant flowing between a nuclear reactor (not shown) as heat source and a heat exchanger (part of which is shown in FIG. 1 and designated generally by the numeral 2), the ducting 1 comprises an outer pipe 3 and an inner pipe 4 coaxial with the pipe 3. The pipe 4 provides a duct 5 for the flow of hot gas and annulus 6 between the pipes 3, 4 provides a duct for the countercurrent flow of cool gas. A flow control valve is provided to simultaneously control gas flow in the duct 5 and in the duct provided by the annulus 6, the valve being of the piston type and generally indicated by the numeral 7. The end portion of the duct 5 is formed by a pipe portion $4^1$ which is end lapped on the pipe 4 and is of greater thickness compared therewith and thereby possesses greater rigidity. The end portion of the pipe 3 is fabricated as follows: the pipe 3 has a flanged end secured in abutment with one flanged end of a nozzle 39 in heat exchanger outer wall 19, the nozzle 39 defining an aperture 32 for the pipe 4 and the pipe portion $4^1$, the other flanged end of the nozzle 39 is secured in abutment with one flanged end of a part 33 which changes in diameter and which has peripherally spaced longitudinal ribs 8 secured to its internal surface and to the exterior surface of the pipe portion $4^1$ thereby adding to the rigidity of the portion $4^1$, and the other flanged end of the part 33 is secured in abutment with one flanged end of a cylindrical-walled part 34 having an aperture 35 in its upper wall. The free end of the pipe portion $4^1$ is bent back outwardly and is flanged and secured in abutment with the other flanged end of the part 34, an annulus $6^1$ (which is a continuation of the annulus 6 between the pipes 3, 4) between the portion $4^1$ and the parts 39, 33 and 34 being thereby terminated at 9.

The portion $4^1$ has an aperture 36 in its upper wall providing an outlet for a pipe 10 conveying hot fluid from the interior of the portion $4^1$, the pipe 10 extending through the aperture 35 in the part 34. Four equi-spaced ports (three only of which are shown in FIG. 1 and designated 11) are provided in the portion $4^1$ adjacent the part 9 thereof. The ports 11 provide cool gas inlets to the annulus $6^1$ and thence to the annulus 6. The valve 7 has its hollow piston 12 positioned within the portion $4^1$. Piston rings 13 are provided to effect a sliding seal between the piston 12 and the interior surface of the portion $4^1$, which forms a cylinder for the piston 12. The piston 12 is transversely divided by a wall 14 which has coupled to it at 37 a piston rod 15 itself coupled at 38 to an operating rod 16. The rod 16 extends outwardly and projects through a nozzle 18 of the heat exchanger wall 19 diametrically opposite to the nozzle 39 aforesaid, being slidable in a guide 20 secured to a cover $18^1$ secured to the nozzle 18 and having a pressure seal 21. The piston 12 has a port 22 and vanes 23 are provided across the interior surface of the piston 12 to reduce pressure drop in the fluid flow as it changes direction due to the wall 14.

A flexible seal 24 is provided between the part 34 and the pipe 10 where the latter extends through the aperture 35. The pipes 4, 10 have internal linings of heat insulating material 25, 26 respectively. The heat exchanger 2 has an inner wall 27 to which the portion $4^1$ is secured.

In FIG. 2 like parts to those shown in FIG. 1 are designated by the same numerals. The main difference shown in FIG. 2 is that whereas in FIG. 1 the valve 7 is designed for push-pull operation, in FIG. 2 valve $7^1$ is designed for rotary operation. In consequence thereof, the valve $7^1$ has a rotatable sleeve $12^1$ having a port 40, only one port 11 (as compared with the four described with reference to FIG. 1) being provided in the portion $4^1$. At least one longitudinal seal 41 is provided to seal during rotation of the valve $7^1$.

Other differences between the embodiment shown in FIG. 2 and that shown in FIG. 1 are that the parts 33, 34 are made integral and the free end of the portion $4^1$ which is bent back outwardly is welded to one end of the part 34.

In the drawings the valves 7, 7¹ are shown in the open position. Hot gas flowing from the duct 5 enters the interior of the piston 12 or the sleeve 12¹ (as shown by arrows 28), and is turned by the vanes 23 to pass through the port 22 and into the pipe 10 to flow into the heat exchanger 2 (as shown by arrows 29, 29¹).

After exchanging its heat, the resulting cool gas flows downwardly in contact with the wall 19 of the heat exchanger 2 to a circulator (not shown) at the base of the heat exchanger 2 and is caused by the circulator to flow upwardly through the space defined by the walls 27, 19 (as shown by arrow 30) and thence into the open end of the portion 4¹, through the ports 11 and into the annulus 6¹ (as shown by arrows 31), out of the heat exchanger 2 and into the annulus 6 to flow countercurrently to the inflowing hot gas in the duct 5. Gas flow is controlled (including stopping) by the piston 12 or the sleeve 12¹, on operation of the rod 16 from outside the heat exchanger 2, to partly or fully obturate the ports 11 and at the same time partly or fully shut off the pipe 10 from communication with the duct 5.

The ribs 8 in addition to increasing the rigidity of the portion 4¹ serve to prevent or reduce longitudinal and lateral expansion and contraction occurring between the portion 4¹ and the part 33 and part 34 associated therewith.

I claim:

1. A heat exchanger having coaxial valved ducting for fluid flow to and from said heat exchanger, said coaxial valved ducting comprising an inner pipe, an outer pipe defining an annulus around said inner pipe, said inner pipe and said annulus having coaxial fluid access ports at the first end of the ducting, means sealing said annulus at the second end of the ducting, the inner pipe defining in its wall a first fluid port spaced from said second end of the ducting and a second fluid port nearer said second end of the ducting, said first fluid port communicating from the inside of said inner pipe to means for flowing fluid from said inner pipe through said annulus to the exterior of said outer pipe and through said heat exchanger, and said second fluid port communicating between the inside of said inner pipe and said annulus and providing an opening to said annulus for fluid entering from said second end of the inner pipe, said second end of the inner pipe and said means for flowing fluid from said inner pipe being in communication through said heat exchanger, and further comprising a piston disposed movably in said inner pipe and adapted to partition the inner pipe between said first and second ports, and means to move said piston in said inner pipe to adjust simultaneously the opening of the both of said ports.

2. A heat exchanger as claimed in claim 1 wherein the piston is movable axially to adjust the opening of the ports and said means to move said piston consists of an operating rod movable longitudinally to said inner pipe.

3. A heat exchanger as claimed in claim 1 wherein the piston is movable rotatably to operate the valve, and said means to move said piston consists of an operating rod rotatably mounted to operate the valve.

4. A heat exchanger as claimed in claim 1 wherein spaced longitudinal ribs are provided within said piston adjacent said first fluid port.

References Cited in the file of this patent

UNITED STATES PATENTS

| | | |
|---|---|---|
| 2,233,934 | Backhouse | Mar. 4, 1941 |
| 2,261,596 | Stroobants | Nov. 4, 1941 |
| 2,653,797 | Jensen | Sept. 29, 1953 |
| 2,694,413 | Force | Nov. 16, 1954 |
| 2,751,155 | Collat | June 19, 1956 |
| 2,771,907 | Joy | Nov. 27, 1956 |
| 2,844,324 | Stonich et al. | July 22, 1958 |
| 2,898,937 | Williams | Aug. 11, 1959 |
| 2,920,652 | Rudelick et al. | Jan. 12, 1960 |
| 2,925,985 | McDavid | Feb. 23, 1960 |

FOREIGN PATENTS

| | | |
|---|---|---|
| 1,142,388 | France | Sept. 17, 1957 |